United States Patent
Boyer et al.

(10) Patent No.: US 12,261,280 B2
(45) Date of Patent: Mar. 25, 2025

(54) THERMAL RUNAWAY DETECTION OF AUTOMOTIVE TRACTION BATTERIES EMPLOYING FORCE-SENSING RESISTOR (FSR) PRESSURE SENSOR

(71) Applicant: IEE INTERNATIONAL ELECTRONICS & ENGINEERING S.A., Echternach (LU)

(72) Inventors: Philippe Boyer, Boust (FR); Arthur Cretin, Luxembourg (LU); Patrick Di Mario Cola, Serrouville (FR); Thierry Goniva, Luxembourg (LU); Martin Thinnes, Trierweiler (DE); Lukas Wurth, Arlon (BE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 612 days.

(21) Appl. No.: 17/624,553

(22) PCT Filed: Jun. 3, 2020

(86) PCT No.: PCT/EP2020/065340
§ 371 (c)(1),
(2) Date: Jan. 3, 2022

(87) PCT Pub. No.: WO2021/001107
PCT Pub. Date: Jan. 7, 2021

(65) Prior Publication Data
US 2022/0278385 A1    Sep. 1, 2022

(30) Foreign Application Priority Data

Jul. 3, 2019    (LU) .................................. LU101295

(51) Int. Cl.
*H01M 10/658*    (2014.01)
*H01M 10/48*    (2006.01)
(Continued)

(52) U.S. Cl.
CPC ......... *H01M 10/658* (2015.04); *H01M 10/48* (2013.01); *H01M 10/625* (2015.04);
(Continued)

(58) Field of Classification Search
None
See application file for complete search history.

(56) References Cited

U.S. PATENT DOCUMENTS

| 3,520,184 A | 7/1970 | Tanner et al. |
| 9,806,310 B1 * | 10/2017 | Pounds ............... H01M 10/613 |

(Continued)

FOREIGN PATENT DOCUMENTS

| CN | 105470424 A | 4/2016 |
| CN | 206067536 U | 4/2017 |

OTHER PUBLICATIONS

International Search Report corresponding to International Application No. PCT/EP2020/065340, dated Sep. 1, 2020, 3 pages.
(Continued)

*Primary Examiner* — Wyatt P McConnell
(74) *Attorney, Agent, or Firm* — Reising Ethington P.C.

(57) ABSTRACT

A detection device for detecting a thermal runaway condition in a rechargeable automotive traction battery that includes a closed traction battery housing for receiving at least a plurality of rechargeable electrochemical energy cells and being equipped with a safety relief valve. The detection device includes a force-sensing resistor. The force-sensing resistor has flexible substrates separated by a spacer member and defining a force-sensitive area, and a venting duct connecting a space between the two substrates and a vent
(Continued)

outlet. At least the force-sensitive area of the force-sensing resistor is placeable inside the traction battery housing, and the vent outlet is fluidically connectable to a detection region of an interior space of the traction battery housing which is located in the vicinity of the safety relief valve.

10 Claims, 2 Drawing Sheets

(51) Int. Cl.
  *H01M 10/625* (2014.01)
  *H01M 50/204* (2021.01)
  *H01M 50/249* (2021.01)
(52) U.S. Cl.
  CPC ....... *H01M 50/204* (2021.01); *H01M 50/249* (2021.01); *H01M 2200/20* (2013.01); *H01M 2220/20* (2013.01)

(56) References Cited

U.S. PATENT DOCUMENTS

| | | | |
|---|---|---|---|
| 2010/0068607 A1* | 3/2010 | Spare | H01M 10/48 429/163 |
| 2019/0003906 A1* | 1/2019 | Dervish | A61B 5/1038 |

OTHER PUBLICATIONS

Written Opinion corresponding to International Application No. PCT/EP2020/065340, dated Sep. 1, 2020, 5 pages.
Koch, S., Birke, K.P., Kuhn, R., Fast Thermal Runaway Detection for Lithium-Ion Cells in Large Scale Traction Batteries—Electrical Energy Storage Systems, Institute for Photovoltaics, University of Stuttgart, Germany, published Mar. 27, 2018, 11 pages.
English summary of Chinese Office Action corresponding to application 202080048930.8, dated Mar. 22, 2024, 9 pages.

* cited by examiner

THERMAL RUNAWAY DETECTION OF AUTOMOTIVE TRACTION BATTERIES EMPLOYING FORCE-SENSING RESISTOR (FSR) PRESSURE SENSOR

TECHNICAL FIELD

The invention relates to a detection device for detecting a thermal runaway condition in a rechargeable automotive traction battery and a closed automotive traction battery housing including such detection device.

BACKGROUND

In the field of motor vehicle technology, motor vehicles are known which comprise a drive that includes an electric drive train with an electric motor that can be operated by means of an electric current generated by an electrical energy source. The electrical energy source can be designed as an electrochemical energy storage device, for example as at least one rechargeable battery, often somewhat inaccurately referred to as a traction battery.

Such automotive vehicles may be designed as a battery electric vehicle (BEV) that exclusively employs an electric motor for propulsion, a hybrid electric vehicle (HEV) comprising an internal combustion engine and an electric propulsion system, or a plug-in hybrid vehicle (PHEV) including an internal combustion engine and a traction battery that can be recharged by connecting a plug to the power grid. A common feature of these automotive vehicles is a rechargeable traction battery having a (ampere-hour) capacity that allows for an acceptable range of the vehicle.

Due to the amount of energy that can be stored in the rechargeable battery, there are increased security requirements in order to prevent the amount of energy stored from being released suddenly. Therefore, it is essential to be able to detect whether a thermal runaway started inside the battery pack before any smoke or fire reaches inside a vehicle compartment.

Thermal runaway is known to be one of the most serious failure modes of a rechargeable traction battery. Details are, for instance, described in Koch, Sascha et al. "Fast Thermal Runaway Detection for Lithium-Ion Cells in Large Scale Traction Batteries." (*Batteries* 2018, 4(2), 16; DOI:10.3390/batteries4020016): Thermal runaway of single cells within a large scale lithium-ion battery is a well-known risk that can lead to critical situations if no counter measures are taken in today's lithium-ion traction batteries for battery electric vehicles (BEVs), plug-in hybrid electric vehicles (PHEV) and hybrid electric vehicles (HEVs). The United Nations have published a draft global technical regulation on electric vehicle safety (GTR EVS) describing a safety feature to warn passengers in case of a thermal runaway. Fast and reliable detection of faulty cells undergoing thermal runaway within the lithium-ion battery is therefore a key factor in battery designs for comprehensive passenger safety. A set of various possible sensors has been chosen based on the determined cell thermal runaway impact. These sensors have been tested in different sized battery setups and compared with respect to their ability of fast and reliable thermal runaway detection and their feasibility for traction batteries. The selected sensors are a voltage sensor, a gas sensor, a smoke detector, a creep distance sensor, which is sensitive to a pollution of pads arranged on its surface, a temperature sensor, a pressure sensor, placed on the battery cells, and measuring absolute pressure in the range of $2\,kPa \leq p_{sens} \leq 304\,kPa$ for determining the rise of internal battery pressure due to gas generation of a single cell, and a single point thin film piezo-resistive force sensor with the range of $0\,N \leq F_{sens} \leq 445\,N$ that is used to measure the force between a cell in thermal runaway and adjacent parts/cells caused by the cell swelling.

SUMMARY

It is therefore an object of the invention to provide a detection device of low complexity that is capable of reliably detecting a thermal runaway condition in a rechargeable traction battery of an automotive vehicle, preferably in an as early as possible stage, for instance before an outbreak of fire or smoke is noticeable inside the vehicle.

In one aspect of the present invention, the object is achieved by a detection device for detecting a thermal runaway condition in a rechargeable automotive traction battery. The automotive traction battery comprises a closed traction battery housing for receiving at least a plurality of rechargeable electrochemical energy cells. The detection device includes a force-sensing resistor that comprises at least two flexible substrates being separated by a spacer member and defining a force-sensitive area, and a venting duct connecting a space between the two substrates and a vent outlet of the force-sensing resistor. At least the force-sensitive area of the force-sensing resistor is placeable inside the traction battery housing. The vent outlet is fluidically connectable to a detection region of an interior space of the traction battery housing, the detection region being located in the vicinity of the safety relief valve.

The term "automotive", as used in this patent application, shall particularly be understood as being suitable for use in vehicles including passenger cars, trucks, semi-trailer trucks and buses. The term "closed traction battery housing", as used in this patent application, shall particularly be understood as a housing whose fluidic leakage to an exterior space of the housing is sufficiently low to allow for an increase in pressure in the interior space of the housing for a gas generation rate that is to be expected in a thermal runaway condition.

In a typical FSR, as intended in this application, a paste-like sensing film may be sandwiched between two electrically conducting electrodes, which are covered by polymer films. An electric resistance between the electrodes can drop sharply when a predetermined force is applied to the sensing film. This change or drop in resistance may be detected and/or measured by a control circuit or resistance detection circuit operatively coupled to the FSR sensor.

During normal operation of the electrochemical energy cells the safety relief valve is in a closed state, and balanced pressure exists in the interior space of the traction battery housing, which is also exerted to the force-sensitive area of the FSR, and the venting duct between the two flexible substrates of the FSR.

The situation of balanced pressure persists even when, in a thermal runaway condition of at least one of the electrochemical energy cells, the pressure inside the traction battery housing increases to values below a predefined pressure limit of the safety relief valve. When the pressure in the interior space of the traction battery housing exceeds the predefined pressure limit, the safety relief valve is transferred into an open state and a gas flow is generated that exits the traction battery housing at the safety relief valve, passing through the detection region.

While the generated gas flow is passing through the detection region, a static pressure decreases according to the Bernoulli's principle (Venturi effect), and that by fluidically connecting the vent outlet and the venting duct to the detection region, the decrease in static pressure is transmitted to the venting duct. As a result, the pressure that is applied to outer surfaces of the force-sensitive area of the FSR predominates, and a mechanical force is induced to the force-sensitive area which at a predefined pressure difference can cause an electric resistance of the FSR to drop sharply.

A detection device of low complexity for detecting a thermal runaway condition in a rechargeable automotive traction battery in an early stage can thus be provided. Moreover, signals from FSRs can be evaluated using relatively simple electronics, which can keep the hardware effort at a low level.

In preferred embodiments of the detection device, one of the flexible substrates of the force-sensing resistor is configured to be arrangeable in contact with a part of an inner wall of the traction battery housing. The phrases "configured for" and "configured to", as used in this application, shall in particular be understood as being specifically laid out, furnished or arranged. In this way, the inner wall of the traction battery housing can be used as an abutment to support the FSR and to create a defined and directed effect of an increased pressure, in case of a thermal runaway condition, inside the traction battery housing on the FSR that outweighs the pressure in the venting duct of the FSR. Further, the FSR can be placed inside the traction battery housing in a most space-saving manner. The control circuit or resistance detection circuit operatively coupled to the FSR sensor may preferably arranged outside of the battery housing and coupled to the FSR sensor by appropriate connection lines.

In preferred embodiments, the detection device further comprises a fluidic connecting member having two ends. One of the ends is fluidically connected to the vent outlet, and the other one of the ends is configured to fluidically connect the vent outlet to the detection region. By using the fluidic connecting member, the FSR can be located and fulfill its intended function properly in a variety of positions depending on a specific application, and a large freedom in design can thus be accomplished.

Preferably, the venting duct is defined by the spacer member. By using the spacer member in a double function the design of the FSR can be kept simple.

In another aspect of the invention, a closed automotive traction battery housing defining an interior space that is configured for receiving at least a plurality of rechargeable electrochemical energy cells is provided. The traction battery housing is equipped with a safety relief valve and comprises an embodiment of the detection device as disclosed herein. At least the force-sensitive area of the force-sensing resistor is placed inside the traction battery housing. The vent outlet of the FSR is fluidically connected to a detection region of an interior space of the traction battery housing which is located in the vicinity of the safety relief valve.

The benefits described in context with the detection device apply to the proposed automotive traction battery housing to the full extent.

In preferred embodiments, the automotive traction battery housing further comprises a pipe socket having two ends. One of the ends is fluidically connected to the interior space of the traction battery housing, and the safety relief valve is arranged at the other end of the pipe socket. In this way, in the event of a thermal runaway condition of at least one of the electrochemical energy cells the decrease in static pressure in the detection region according to the Bernoulli's principle can be enhanced. The pipe socket may have an elliptical, in particular a circular cross-sectional area but may also have a cross-sectional area that is delimited by a polygon with or without rounded edges.

Preferably, an opening of the safety relief valve and at least one lateral dimension of the pipe socket are adapted to each other such that a cross-sectional area of the opening of the safety relief valve and a cross-sectional area of the pipe socket overlap to cover a major portion of either one of the cross-sectional areas. The term "a major part", as used in this application, shall particularly be understood as equal to or more than 50%, more preferably more than 60%, and, most preferably, more than 70% of a cross-sectional area, and shall encompass a part of 100% coverage. In this way, in the event of a thermal runaway condition of at least one of the electrochemical energy cells the decrease in static pressure in the detection region according to the Bernoulli's principle can be optimized without affecting the safety function of the safety relief valve.

In preferred embodiments of the automotive traction battery housing having a detection device that includes a fluidic connecting member as described before, the other one of the ends of the fluidic connecting member is attached to a side wall of the pipe socket. In this way, an especially reliable and durable positioning of the fluidic connecting member can be accomplished, by which a reliable and well-defined detection of a thermal runaway condition can be ensured.

Preferably, the other one of the ends of the fluidic connecting member includes an opening whose normal is aligned in a direction that essentially lies in a plane arranged perpendicular to a center line of the pipe socket. In this way, an adverse effect on the function of the detection device by the dynamic pressure of generated gas flowing through the detection region in the event of a thermal runaway condition can be avoided at least to a large extent.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

In the different figures, the same parts are always provided with the same reference symbols or numerals, respectively. Thus, they are usually only described once.

DETAILED DESCRIPTION

Figure 1:
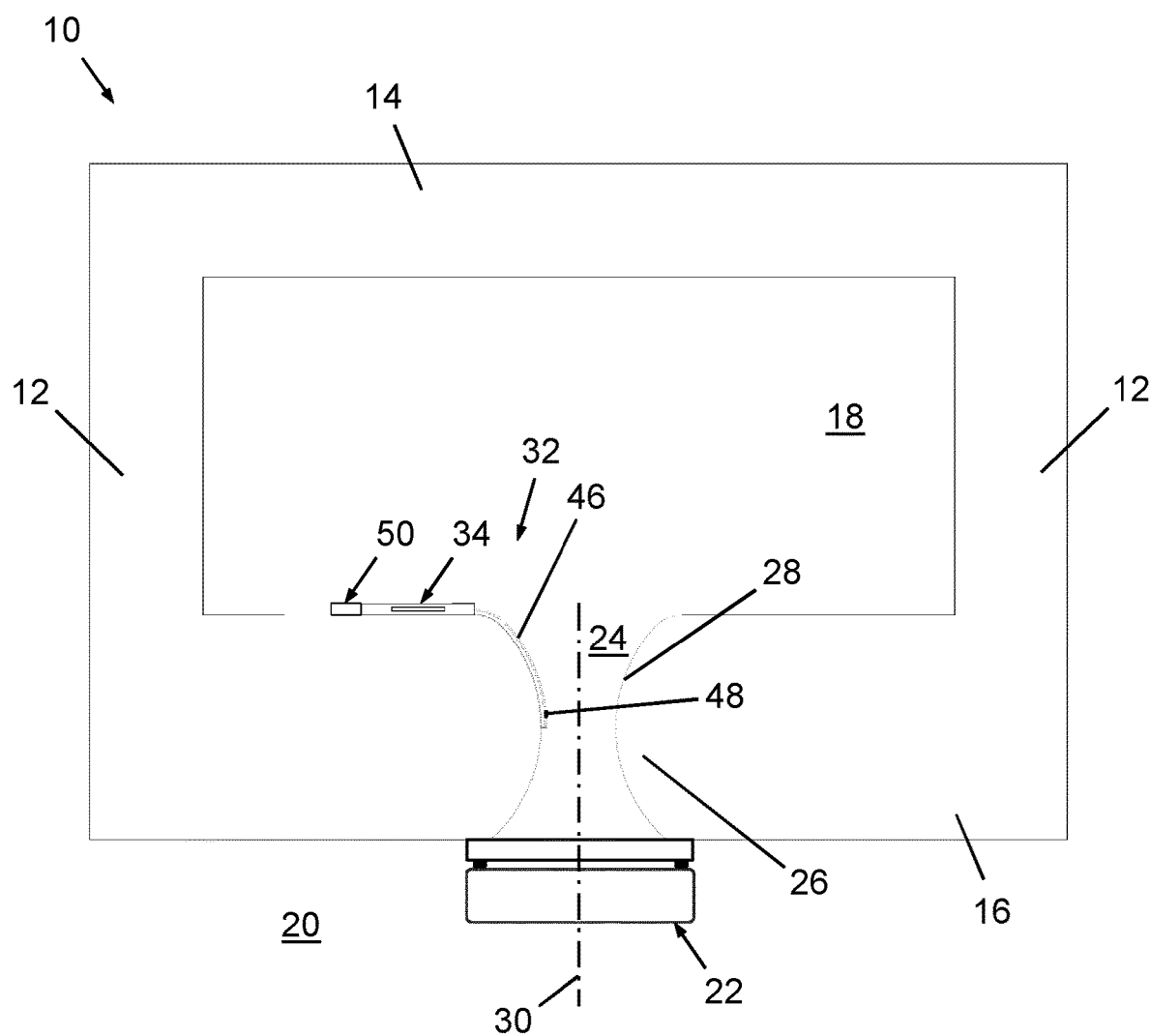
FIG. 1 schematically illustrates a closed automotive traction battery housing with an embodiment of the detection device in accordance with the invention in an installed state in a sectional side view.

FIG. 1 schematically illustrates a closed automotive traction battery housing 10 with a possible embodiment of the detection device in accordance with the invention in an installed state in a sectional side view.

The traction battery housing 10 defines an interior space 18 that is configured for receiving a plurality of rechargeable electrochemical energy cells not shown in FIG. 1. The electrochemical energy cells may form a lithium-ion battery (accumulator). The traction battery housing 10 is closed in the sense that a fluidic leakage of the traction battery housing 10 to an exterior space 20 is sufficiently low to allow for an increase in pressure in the interior space 18 of the traction battery housing 10 at a gas generation rate that is to be expected in a thermal runaway condition of at least one of the electrochemical energy cells.

The traction battery housing 10 may be made, at least to a major part, from metal sheet, e.g. aluminum injected side walls, from fiber reinforced plastic, for instance glass fiber reinforced plastic, or from a combination of those materials. The traction battery housing 10 comprises side walls 12, a cover plate 14 and a base plate 16.

The traction battery housing 10 is furnished with a safety relief valve 22 as a fail-safe. When the pressure in the interior space 18 of the traction battery housing 10 exceeds a predefined pressure limit, the safety relief valve 22 provides a fluidic connection for the gas inside the interior space 18 of the traction battery housing 10 to exit to the exterior space 20 of the traction battery housing 10. The safety relief valve 22 may be designed as a spring-loaded valve. In other embodiments of the traction battery housing, the safety relief valve 22 may be designed as a burst disk. In general, any other type of safety relief valve may be employed that appears suitable to those skilled in the art. The traction battery housing 10 includes a detection region 24 which forms part of the interior space 18 and is located in the vicinity of the safety relief valve 22.

The traction battery housing 10 may further comprise a pipe socket 26 having two ends and a center line 30 virtually connecting the two ends. One of the ends is fluidically connected to the interior space 18 of the traction battery housing 10. The safety relief valve 22 is arranged at the other end of the pipe socket 26. A cross-sectional area of the pipe socket 26 arranged perpendicular to the center line 30 has a circular shape whose area size varies along the center line 30. An opening of the safety relief valve 22 and a lateral dimension of the pipe socket 26 are adapted to each other such that a cross-sectional area of the opening of the safety relief valve 22 and the cross-sectional area of the pipe socket 26 close to the safety relief valve 22 overlap to cover a major portion of both cross-sectional areas.

Figure 2:
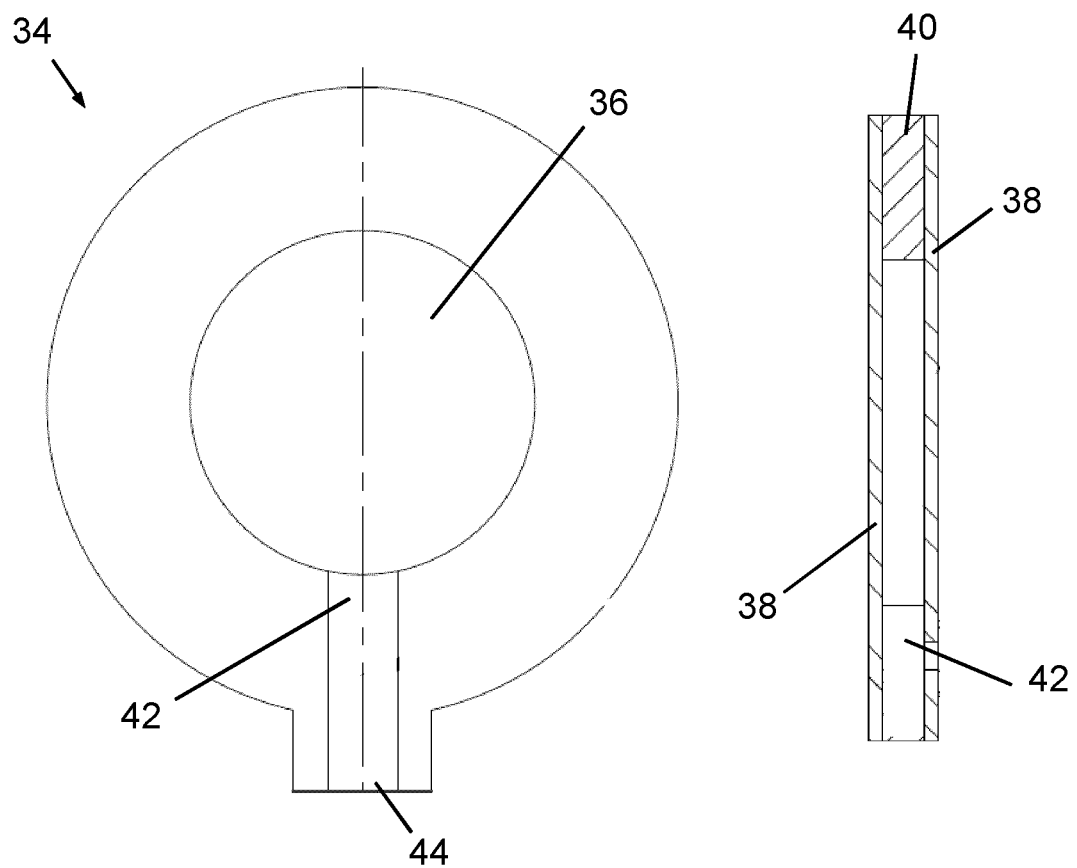
FIG. 2 shows a schematic detailed front view and sectional side view of the force-sensing resistor (FSR) of the detection device pursuant to FIG. 1.

The traction battery housing 10 is equipped with a detection device 32 for detecting a thermal runaway condition in the rechargeable automotive traction battery. The detection device 32 includes a force-sensing resistor (FSR) 34 that is located inside the traction battery housing 10. The FSR 34 may comprise two flexible substrates 38, which are separated by a spacer member 40 and define a force-sensitive area 36 (FIG. 2). This assembly may enclose a layer of conductive ink. The FSR 34 may include two sets of electrically conductive lines that are electrically insulated from each other and are attached to at least one of the two flexible substrates 38. When a sufficiently large force is applied to the outside of FSR 34 or a sufficiently large force is induced by underpressure according to the Bernoulli's principle (Venturi effect) to the inside of the force-sensing area, the layer of conductive ink establishes electrically conductive paths between the two sets of electrically conductive lines, resulting in a decrease of the electric resistance.

The FSR 34 further comprises a venting duct 42, which is defined by the spacer member 40. The venting duct 42 connects a space between the two flexible substrates 38 and a vent outlet 44 of the FSR 34.

The flexible substrates 38 may be made from a plastic material that is selected from a group of plastic materials including, but not being limited to, polyester (PE), polyethylene terephthalate (PET), polyimide (PI), polyetherimide (PEI), polyethylene naphthalate (PEN) and combinations of at least two of these plastic materials.

Suitable FSRs are commercially available in a large number of variations, covering a large range of applications.

Referring again to FIG. 1, the FSR 34 is placed inside the traction battery housing 10 such that one of the flexible substrates 38 of the FSR 34 is arranged in contact with a part of an inner wall of the traction battery housing 10. The FSR 34 may be attached to the inner wall by using an adhesive.

The detection device 32 further includes a fluidic connecting member 46. The fluidic connecting member 46 comprises a tube having two ends. One of the ends of the fluidic connecting member 46 is fluidically connected to the vent outlet 44 of the FSR 34. The other one of the ends is arranged in the detection region 24 and thus fluidically connects the vent outlet 44 to the detection region 24. The end facing the FSR 34 is attached to a part of the inner wall of the traction battery housing 10 that partially defines the detection region 24 and to a side wall 28 of the pipe socket 26. The end facing away from the FSR 34 is attached to the side wall 28 of the pipe socket 26. This end includes an opening 48 of elliptical shape having a virtual normal. The normal is aligned in a direction that essentially lies in a plane arranged perpendicular to a center line 30 of the pipe socket 26, i.e. a plane corresponding to a cross-sectional plane.

During normal operation of the electrochemical energy cells the safety relief valve 22 is in a closed state, and the pressure in the interior space 18 of the traction battery housing 10, which is also exerted to the force-sensitive area 36 of the FSR 34, and the pressure at the vent outlet 44 and in the venting duct 42 between the two flexible substrates 38 of the FSR 34 is balanced.

The situation of balanced pressure persists even when, in a thermal runaway condition of at least one of the electrochemical energy cells, the pressure inside the traction battery housing 10 increases to values below a predefined pressure limit of the safety relief valve 22. When the pressure in the interior space 18 of the traction battery housing 10 exceeds the predefined pressure limit, the safety relief valve 22 is transferred into an open state and a gas flow is generated that exits the traction battery housing 10 at the safety relief valve 22, passing through the detection region 24. Consequently, a decrease in static pressure is generated in the detection region 24 and is transmitted to the venting duct 42 of the FSR 34. Pressures in the interior space 18 of the traction battery housing 10 and in the venting duct 42 between the two flexible substrates 38 of the FSR 34 are no longer balanced, the pressure in the interior space 18 outweighing the pressure in the venting duct 42. When a predefined threshold for the gas flow is exceeded, a sharp drop of the electric resistance of the FSR 34 can readily be detected by a control circuit or resistance detection circuit operatively coupled to the FSR sensor.

It will, be appreciated, that the detection device may further comprise an optional liquid detection sensor, which is implemented to detect any liquid leakage inside the battery pack. This liquid detection sensor may be advantageously placed inside the battery pack and preferably in proximity to the FSR sensor, so that both the FSR sensor and the liquid detection sensor may be connected to respective control circuits or a common control circuit by respective connection lines.

It is pointed out herewith that the figures in this application cannot be regarded as drawings to scale. In particular, a ratio of longitudinal to transverse dimensions was chosen for reasons of illustration and does not have to correspond to the actual conditions.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A detection device for detecting a thermal runaway condition in a rechargeable automotive traction battery comprising a closed traction battery housing for receiving at least a plurality of rechargeable electrochemical energy cells and being equipped with a safety relief valve, the detection device including a force-sensing resistor that comprises:
   at least two flexible substrates being separated by a spacer member and defining a force-sensitive area, and
   a venting duct connecting a space between the two substrates and a vent outlet of the force-sensing resistor,
wherein at least the force-sensitive area of the force-sensing resistor is arranged inside the traction battery housing, and the vent outlet is fluidically connected to a detection region of an interior space of the traction battery housing which is located in the vicinity of the safety relief valve.

2. The detection device as claimed in claim 1, wherein one of the flexible substrates of the force-sensing resistor is configured to be arrangeable in contact with a part of an inner wall of the traction battery housing.

3. The detection device as claimed in claim 1, further comprising a fluidic connecting member having two ends, wherein one of the ends is fluidically connected to the vent outlet, and the other one of the ends is configured to fluidically connect the vent outlet to the detection region.

4. The detection device as claimed in claim 1, wherein the venting duct is defined by the spacer member.

5. A closed automotive traction battery housing defining an interior space that is configured for receiving at least a plurality of rechargeable electrochemical energy cells and that is equipped with a safety relief valve, the traction battery housing comprising a detection device as claimed in claim 1, wherein at least the force-sensitive area of the force-sensing resistor is placed inside the traction battery housing, and the vent outlet is fluidically connected to a detection region of an interior space of the traction battery housing which is located in the vicinity of the safety relief valve such that when gas flows through the detection region and exits the safety relief valve, a static pressure decreases at the detection region.

6. The closed traction battery housing as claimed in claim 5, further comprising a pipe socket having two ends, wherein one of the ends is fluidically connected to the interior space of the traction battery housing, and wherein the safety relief valve is arranged at the other end of the pipe socket.

7. The closed traction battery housing as claimed in claim 6, wherein an opening of the safety relief valve and at least one lateral dimension of the pipe socket are adapted to each other such that a cross-sectional area of the opening of the safety relief valve and a cross-sectional area of the pipe socket overlap to cover a major portion of either one of the cross-sectional areas.

8. The closed traction battery housing as claimed in claim 6 further comprising a fluidic connecting member having two ends, wherein one of the ends is fluidically connected to the vent outlet, and the other one of the ends is configured to fluidically connect the vent outlet to the detection region, wherein the other one of the ends of the fluidic connecting member is attached to a side wall of the pipe socket.

9. The closed traction battery housing as claimed in claim 8, wherein the other one of the ends of the fluidic connecting member includes an opening whose normal is aligned in a direction that essentially lies in a plane arranged perpendicular to a center line of the pipe socket.

10. A closed automotive traction battery housing defining an interior space for receiving a plurality of rechargeable electrochemical energy cells, the battery housing comprising:
   a socket extending through the battery housing and having one end fluidically connected to the interior space and another end;
   a safety relief valve being attached to the battery housing and being fluidically connected to the other end of the socket, the safety relief valve has a predefined pressure limit; and
   a detection device being attached to the battery housing and being configured to detect a thermal runaway condition in the rechargeable electrochemical energy cells, the detection device has a force-sensing resistor at least partially located inside the battery housing, the force-sensing resistor comprises:
      two or more substrates that are separated from one another;
      a spacer member that is at least partially located between the substrates and defines a space between the substrates;
      a venting duct fluidically connected to the space between the substrates; and
      a vent outlet fluidically connected to the venting duct and to a detection region that is located inside the battery housing and near the socket;
   wherein, when a thermal runaway condition occurs and the pressure inside the battery housing exceeds the predefined pressure limit, the safety relief valve is configured to open so that gas flows from the interior space, through the socket and safety relief valve, to an exterior space thereby causing a decrease in static pressure at the detection region, and
   the force-sensing resistor is configured so that the decrease in static pressure at the detection region is fluidically conveyed through the vent outlet and the venting duct to the space between the substrates thereby causing the substrates to flex and change an electrical resistance in the force-sensing resistor.

* * * * *